(12) United States Patent
Moskalev

(10) Patent No.: US 11,289,871 B2
(45) Date of Patent: Mar. 29, 2022

(54) HIGH POWER CW MID-IR LASER

(71) Applicant: IPG PHOTONICS CORPORATION, Oxford, MA (US)

(72) Inventor: Igor Moskalev, Birmingham, AL (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 724 days.

(21) Appl. No.: 16/077,182

(22) PCT Filed: Feb. 10, 2017

(86) PCT No.: PCT/US2017/017428
§ 371 (c)(1),
(2) Date: Aug. 10, 2018

(87) PCT Pub. No.: WO2017/139617
PCT Pub. Date: Aug. 17, 2017

(65) Prior Publication Data
US 2021/0184417 A1    Jun. 17, 2021

Related U.S. Application Data

(60) Provisional application No. 62/294,747, filed on Feb. 12, 2016.

(51) Int. Cl.
*H01S 3/102* (2006.01)
*H01S 3/06* (2006.01)
(Continued)

(52) U.S. Cl.
CPC .......... *H01S 3/0608* (2013.01); *H01S 3/0604* (2013.01); *H01S 3/0817* (2013.01);
(Continued)

(58) Field of Classification Search
CPC .... H01S 3/0608; H01S 3/1026; H01S 3/0817; H01S 3/2308; H01S 3/0604;
(Continued)

(56) References Cited

U.S. PATENT DOCUMENTS 5,541,948 A * 7/1996 Krupke ................. H01S 3/1095
372/41
2008/0130702 A1* 6/2008 Spariosu ................. H01S 3/042
372/67

(Continued)

FOREIGN PATENT DOCUMENTS

JP    02295180 A    6/1990
JP    11354897 A    12/1999

OTHER PUBLICATIONS

Mirov et al. "High Average Power Fe:ZnSe and Cr:ZnSe Mid-IR Solid State Lasers", Advanced Solid State Lasers Conference OSA 2015, United States, OSA Publishing, United States, 2015.

(Continued)

*Primary Examiner* — Xinning(Tom) Niu
(74) *Attorney, Agent, or Firm* — Yuri B. Kateshov, Esq.

(57) ABSTRACT

A CW laser with a rotating ring gain element is disclosed. The ring is pumped at multiple locations and the laser generates a mid-IR output. Multiple pumped gain portions of the ring provide a power scaled output. The gain portions may be positioned in a single resonator cavity, in multiple resonator cavities, and in MOPA architectures with associated focusing, folding, and combining optical elements.

15 Claims, 11 Drawing Sheets

(51) Int. Cl.
*H01S 3/081* (2006.01)
*H01S 3/16* (2006.01)
*H01S 3/23* (2006.01)

(52) U.S. Cl.
CPC .......... *H01S 3/1026* (2013.01); *H01S 3/1623* (2013.01); *H01S 3/1628* (2013.01); *H01S 3/2308* (2013.01)

(58) Field of Classification Search
CPC ........ H01S 3/1628; H01S 3/1623; H01S 3/07; H01S 3/1685; H01S 3/2383; H01S 3/0813; H01S 3/0816; H01S 3/06712; H01S 3/101
See application file for complete search history.

(56) References Cited

U.S. PATENT DOCUMENTS

| | | | |
|---|---|---|---|
| 2009/0245294 A1* | 10/2009 | Alkulov | H01S 3/109 372/6 |
| 2009/0285250 A1 | 11/2009 | Basu | |
| 2010/0027571 A1* | 2/2010 | Murdoch | H01S 3/109 372/22 |

OTHER PUBLICATIONS

Mirov et al., "Mid-IR lasers based on transition metal and rare-earth ion doped crystals", Proceedings of SPIE, United States, SPIE, 2015, vol. 9467, 94672K-1-94672K-12.

* cited by examiner

| Laser Configuration | Wavelength (λ), nm | Max Power at λ, W | Absolute Efficiency, % | Slope Efficiency, % | Beam profile at Max Power (at ~500 mm from OC) |
|---|---|---|---|---|---|
| Dual-channel, dual pump (266 W), four-lens cavity CL-2500-130-D | 2500 nm | 131 W | 58% | 59% | 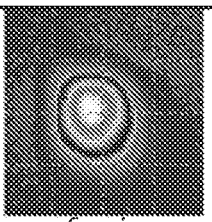<br>Gaussian |
| Single-channel, single pump (109 W), simplest single-lens laser cavity CL-2300-65-D CL-2500-60-D | 2500 nm<br>2300 nm | 68 W<br>62 W | 62%<br>57% | 64%<br>59% | 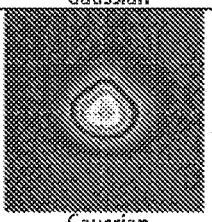<br>Gaussian |
| Single-channel, single pump (109 W), simplest single-lens laser cavity, multi-mirror wavelength selector CL-2940-25-D | 2940 nm | 25 W | 23% | 25% | 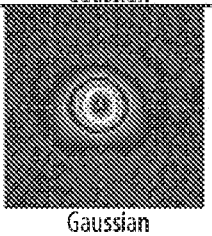<br>Gaussian |
| Single-channel MOPA, dual-pump (226 W), simplest single-lens laser cavity CL-2300-120-D | 2300 nm | 124 W | 55% | 57% | 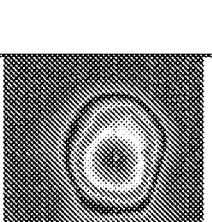<br>Distorted Gaussian |

Figure. 19

HIGH POWER CW MID-IR LASER

CROSS-REFERENCE TO RELATED APPLICATIONS

The present application claims the benefit of Provisional Application Ser. No. 62/294,747 filed on Feb. 12, 2016 which is incorporated herein by reference. The present application is related to application PCT/US2016/023778 filed on Mar. 23, 2016, publication number WO2016154309A1 on Sep. 29, 2016 which is incorporated herein by reference.

TECHNICAL FIELD

The present invention relates to continuous wave (CW) mid-IR solid state lasers. More particularly, to solid state lasers with a rotating ring gain medium and improved output characteristics.

BACKGROUND INFORMATION

Middle-infrared (mid-IR) laser sources operating in the 2-10 μm spectral range are in great demand for a variety of defense related applications including: free space communication, countermeasures, remote sensing, as well as industrial process control and medical applications. Recent progress in optically pumped lasers based on Cr and Fe doped II-VI wide band semiconductors enabled access to high output powers in the 1.9-5 μm spectral range.

The WO2016154309A1 publication, here after referred to as '309, describes such a laser system using a conduction-cooled rotating ring gain medium to scale power. A pump radiation spot follows a path around the ring as it rotates. Pumping is continuous, but as the ring rotates, area of the ring is pumped intermittently as it moves into and out of the pump beam. This intermittent pumping of the medium yields power benefits similar to intermittent quasi-CW (QCT) pumping but with a continuous high power output. As a result, this laser demonstrates pure CW output with maximum output power of 27.5 W at 2450 am and 13.9 W at 2940 nm with average slope efficiencies of 63.7% and 37.4%, respectively.

Power scaling of Cr2+:ZnS/Se lasers is of extreme interest for numerous applications in industrial, medical, material processing, and defense applications. For successful applications of these mid-IR lasers it is especially important to reach multi-tens and hundreds of Watts of output power near 2940 nm output wavelength where most medical applications reside. The output wavelengths near the gain maximum of these materials (2.4 μm) are also of a very high interest for material processing applications where high throughput is especially important, such as the processing of polymers.

Increased power scaling and wavelength selectivity is needed to satisfy the needs of medical applications and material processing in the mid-IR spectrum.

SUMMARY OF THE INVENTION

The above articulated needs are satisfied by the disclosed CW mid-IR laser configured with a rotating ring gain medium and pumping multiple locations on the ring to increase pump power, distribute gain, and scale the output power.

More particularly, in at least one embodiment, the present invention provides a continuous wave ("CW") mid-IR laser comprising: a resonant cavity; a gain medium being formed into a ring and more preferably a ring defined by an inner circumferential surface, an outer circumferential surface, a first face and a second face, the gain medium with a first non-stationary gain portion and a second non-stationary gain portion being positioned within the resonant cavity to provide mid-IR gain and a second non-stationary gain portion between the first and second faces being positioned to provide supplementary mid-IR gain; a first pump source; a second pump source; a rotatable mounting structure in thermal contact with the ring; and a motor coupled to the rotatable mounting structure to rotate the ring about an axis. The first non-stationary gain portion of the ring in transit through the resonant cavity receives pump light sufficient to emit a CW laser beam in the mid-IR spectrum and the second non-stationary gain portion of the ring in transit receives pump light sufficient to provide optical gain and increase the mid-IR output power In preferred embodiments, the gain media is TM:II-VI such as Cr:ZnS or Cr:ZnSe.

In other embodiments, the CW laser of the present invention will have one or optical cavity element for narrowing the spectral line width of the mid-IR output and for mid-IR output wavelength selection.

In other embodiments, the gain medium is a composite stacked ring gain element.

In other embodiments, the first non-stationary gain portion and the second non-stationary gain portion each provide gain in the resonant cavity.

In other embodiments, the first non-stationary gain portion provides gain as a master oscillator and the second non-stationary gain portion provides single pass amplification to output from the master oscillator.

In preferred embodiments, the resonant cavity includes a cavity mirror proximate to the first face of the ring and an output coupler proximate to the first face of the ring.

In other embodiments, optical elements disposed proximate to the second face of the ring are included for redirecting the optical path from the first gain portion to the second gain portion.

In other embodiments, optical elements are included for focusing the first and second pump sources to respective first and second gain portions of the ring.

In other embodiments, one or more lens elements are included for focusing mid-IR light.

In other embodiments, first non-stationary gain portion provides gain in a first resonant cavity and the second non-stationary gain portion provides gain in a second resonant cavity.

In other embodiments, the first non-stationary gain portion provides a first output, the second non-stationary gain portion provides a second output, and a beam combiner combines the first and second outputs into the mid-IR output.

BRIEF DESCRIPTION OF THE DRAWINGS

The current application contains at least one drawing executed in color. Copies of this patent or patent application publication with color drawing(s) will be provided by the Office upon request and payment of the necessary fee.

The above and other aspects, features and advantages of the disclosure will become more readily apparent from the following drawings, in which:

FIG. 19 illustrates a table summarizing the results of the above-illustrated embodiments.

SPECIFIC DESCRIPTION

Figure 1A:
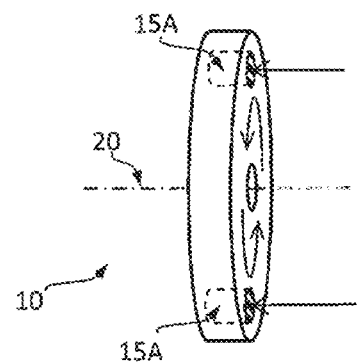
FIG. 1A provides a perspective view of a gain medium.

Reference will now be made in detail to embodiments of the invention. Wherever possible, same or similar numerals are used in the drawings and the description to refer to the same or like parts or steps. The drawings are in simplified form and are not to precise scale. Unless specifically noted, it is intended that the words and phrases in the specification and claims be given the ordinary and accustomed meaning to those of ordinary skill in the diode and liber laser arts. The word "couple" and similar terms do not necessarily denote direct and immediate connections, but also include mechanical and optical connections through free space or intermediate elements.

The present invention represents significant progress in power scaling of Cr:ZnS and Cr:ZnSe laser systems. Unprecedented sub-kW output power has been achieved in CW regime of operation with very simple and reliable laser designs. Because of this unprecedented output power, the present invention opens broad opportunities for Chromium-based Crystal Laser ("CL") systems to be applied to a wide range of industrial applications in the field of material processing.

Figure 1B:
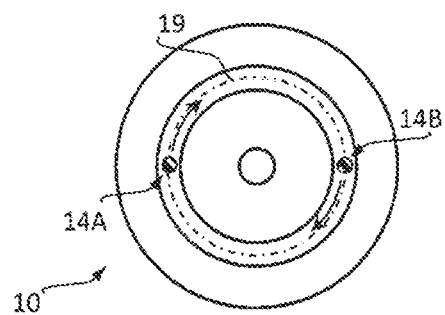
FIG. 1B provides a plan view of a gain medium ring.
Figure 1C:
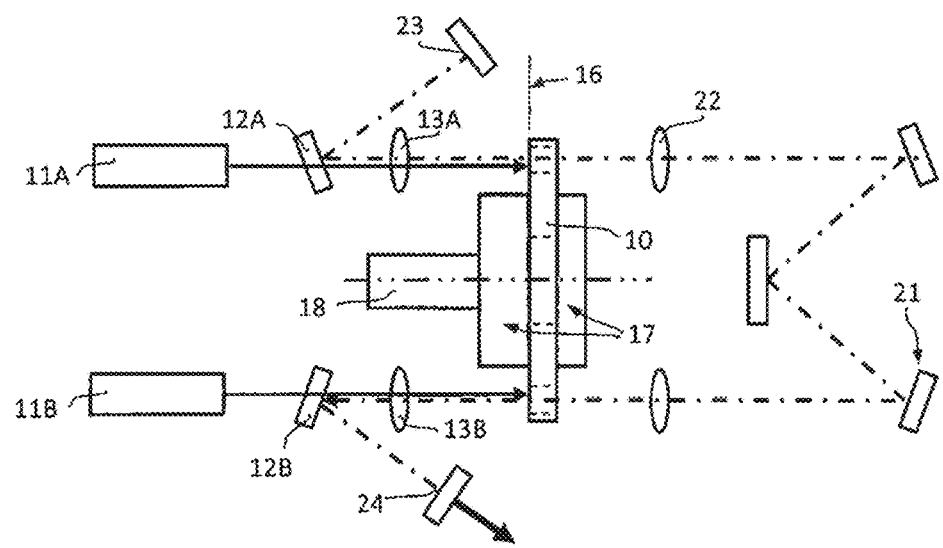
FIG. 1C is one exemplary optical schematic of a 4-lens laser cavity embodiment of the CW mid-IR laser of the present invention.

Power scaling has been achieved with a flexible optical system architecture that provides multiple pump sources to respective gain portions of the ring. Referring to FIG. 1A, FIG. 1B and FIG. 1C, a rotating ring gain medium 10 is pumped from pump sources 11A, 11B at different locations on the gain ring. The pump beams are transmitted through dichroic mirrors 12A, 12B and may be collimated by respective collimating lenses 13A, 13B to efficiently form pump spots 14A, 14B on the gain medium at gain portions 15A, 15B. In at least one embodiment, the pump beams are incident on the first side 16 of the gain medium. It will be appreciated that a pump beam may be propagated to the ring in different ways, for example using mirrors in addition to or in place of lenses, propagating though a focusing lens before a dichroic mirror, and alternate pumping scenarios consistent with end pumped laser design.

The ring is mounted to a ring mount 17 and the mount is rotated by motor 18 to form gain portion track 19. As shown schematically, the pump spots are located in a pattern evenly spaced at approximately 180 degree increments around the ring. However, different azimuthal orientations of the pump spots relative to the axis of the ring may be used. For example, if the ring axis is not coplanar with the optical path, then azimuthal pump spot separation may be less than 180 degrees and laser path separation may be less than a full diameter of the pump spot track around the ring. Radial alignment of the pump spots may superimpose with multiple pump spots onto a single track, but alternative alignments can be used.

In at least one embodiment, the gain portions may coincide at multiple locations along a folded optical path that includes one or more fold mirror 21. The fold mirrors receive light from first gain portion of the ring and redirect the optical propagation path so that the path intercepts the ring a second time at a second gain portion. Additional lenses 22 may be used between the ring and the fold mirrors for beam focusing etc.

A laser resonator is formed advantageously and flexibly in different ways depending on the location of a cavity mirror 23 and an output coupler 24. In at least one embodiment, again referring to FIG. 1C, dichroic mirrors 12A, 12B fold the beam path to a cavity mirror forming one end of the resonator, and to an output coupler disposed proximate to the same side of the ring forming the output end of the resonator. In this way, the gain medium intercepts the optical path two times between the cavity mirror and the output couple. Each gain portion is pumped by a respective pump source 11A, 11B. This effectively puts two active gain portions of the ring in tandem. The dual pump configuration may include optical elements such lenses 22 to propagate optical radiation, for example, to image one pump spot area from one gain portion to another, or to relay a beam waist from one gain portion to another. Each pump may be controlled to vary laser output power and tailor laser resonator performance characteristics. The entire resonator may be modeled and optimized for output beam power, beam quality and beam stability.

Figure 2:
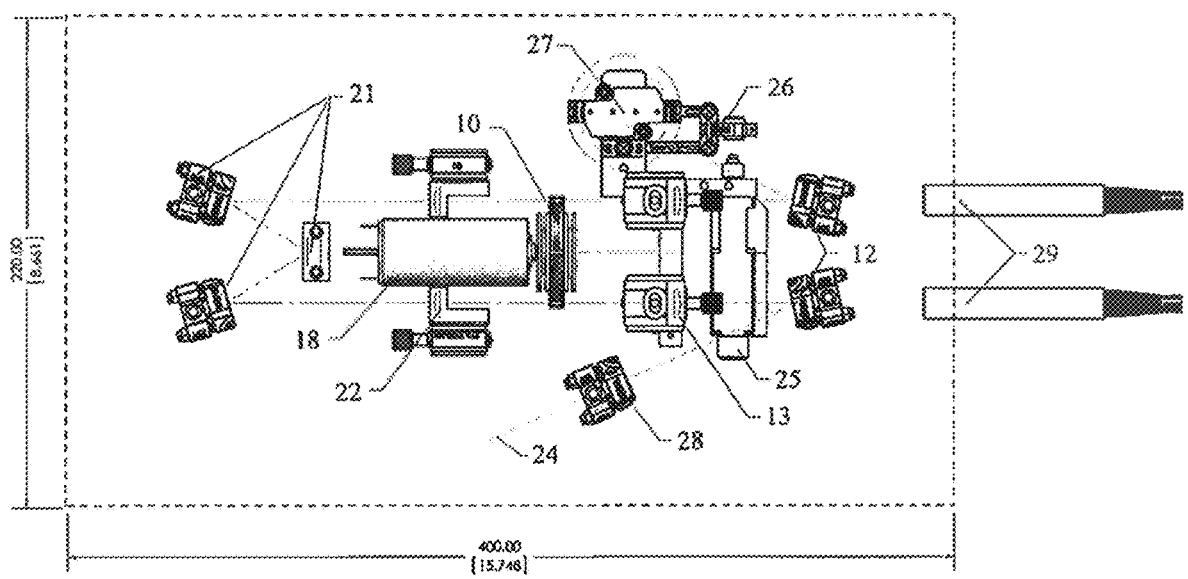
FIG. 2 provides a view of a 4-lens laser cavity embodiment of the CW mid-IR laser of the present invention.

A view of a universal dual-pump, 4-lens laser cavity embodiment is shown in FIG. 2, a general optical scheme of high-power tunable CW Cr:ZnS/Se laser systems based on spinning gain elements. This laser scheme represents a flexible and configurable CL system design and covers the broadest selection of Cr lasers output characteristics with minimal internal reconfigurations. Polycrystalline gain materials were used due to ease of manufacture, but the invention is not so limited. Not all configurations are shown. In CL fixed-wavelength laser systems the stepper motor 25 tuning mechanism 26 and tuning element 27 (e.g. a diffraction grating) is replaced with a High Reflectivity (HR) end mirror. Output 24 exits at element 28, an output coupler or Volume Bragg Grating (VBG). Pump collimators 29 may be collimator TLM-100. Pump configuration and selection of gain element depends on required output power and other parameters. Conversion from high-power systems (>15 W) to low-power systems (<15 W) is performed by replacing the spinning ring gain element with a pair of conventional slab Cr:ZnS/Se gain crystals. Approximate footprint of the laser head enclosure is shown by dashed line (size is in mm). The gain element identified is in the form of a rotary ring, allowing for mounting the gain element on a mandrel as well as providing surface area to juxtapose such a ring onto thermal management structures and materials.

The advantages of the 4-lens laser design include a broad range of CW Cr:ZnS/Se laser systems including; tunable lasers, fixed-wavelength lasers, high-power and low-power lasers and single-frequency lasers (untested). Further advantages include multiple pump sources in single cavity (226 W of total pump from dual TLM-100-1908 lasers have been tested), and flexible configurations of gain media such as spinning ring Cr:ZnS and Cr:ZnSe elements, dual gain elements made of a pair of conventional slab gain crystals (for low-power lasers). These advantages are offset the complexity of the laser cavity.

Figure 3:
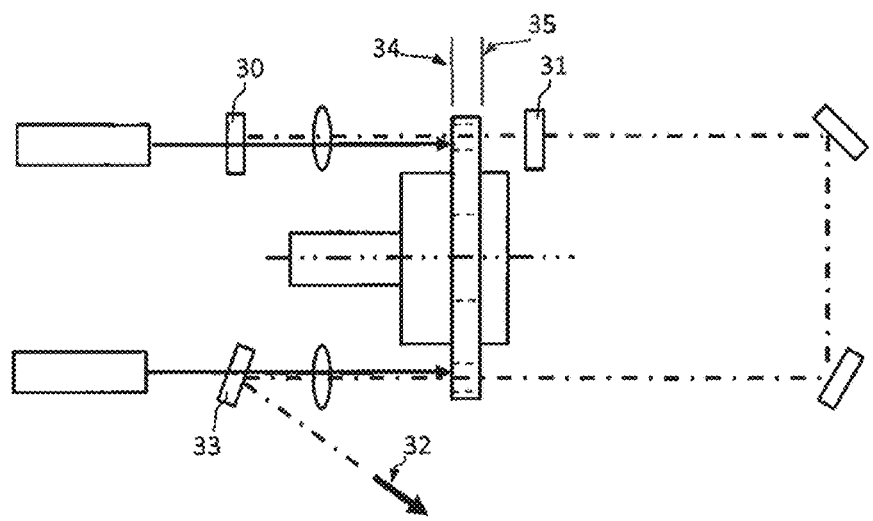
FIG. 3 is one exemplary optical schematic of a Master Oscillator Power Amplifier (MOPA) embodiment of the CW mid-IR laser of the present invention.

In at least one embodiment, referring to FIG. 3, dichroic 30 is used as a cavity mirror on a first side 34 of the gain ring, and an output coupler 31 is located in the optical path on the opposite side 35 of the ring to form a resonator such that a single pump spot on the ring is within the resonator. Thus, the resonator is formed with the first gain portion as a master oscillator. Output from the master oscillator passes through a second gain portion as a single pass amplifier, and the output 32 is extracted with dichroic mirror 33.

Figure 4:
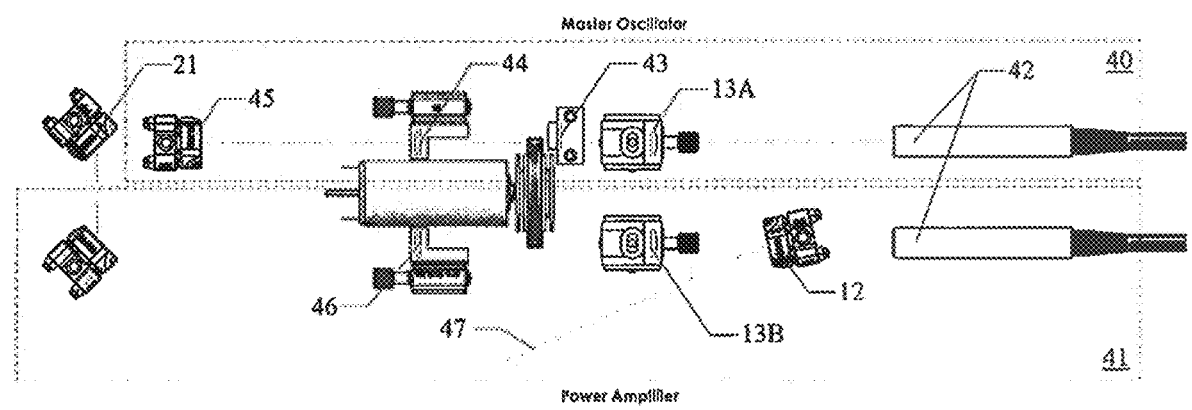
FIG. 4 provides a view of a MOPA embodiment of the CW mid-IR laser of the present invention.

Simple single-lens master oscillator and single-pass power amplifier embodiments are provided by the present invention. In FIG. 4 a view of a single-lens, single-pump channel cavity design is shown. The master oscillator design shown at 40 represents a feasible industrial laser model with fixed output wavelength where random polarization of the laser beam is acceptable. Use of the spinning gain material simultaneously at two locations allows for a supremely efficient production of laser light.

Pump collimators 42 may be collimator TLM-100-1098. The master oscillator pump may be focused by pump lens 13A, and then enter the resonator at fixed input mirror 43. Lens 44 in the master oscillator is a cavity lens and the resonator cavity output exits at element 45 which can be an OC or a VBG. The master oscillator output is focused by focusing lens 46 in power amplifier 41. Lens 13B functions as a pump/collimating lens, and dichroic mirror 12 extracts the MOPA output 47.

Furthermore, instead of the (single resonator) MOPA system shown in FIG. 4, a pair of master oscillators with polarization beam combining can be built which would double the total output power. The MOPA configuration of the CL laser platform as shown in FIG. 4 was tested with CL-2300-60-D master oscillator.

The advantages of the single-lens laser design are a very simple and highly efficient master oscillator design with a trivial alignment algorithm, low misalignment sensitivity, and high reliability. The input mirror can be replaced with proper HR/AR dichroic coating of the gain element in the case of dual master oscillator system with polarization beam combining. Independent beam shaping of the master oscillator laser mode and pump beam allows for further efficiency improvement. Ultra-narrow linewidth is achievable with single VBG grating serving as output coupler. Widely tunable lasers are not feasible in this single lens cavity design.

Figure 5:
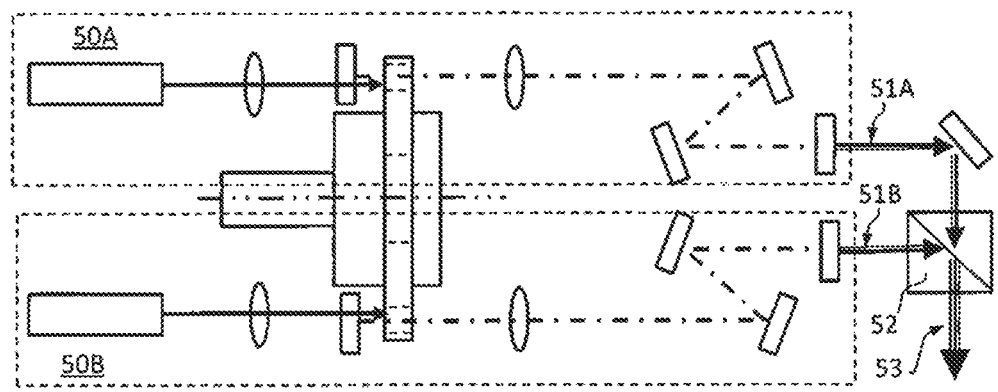
FIG. 5 is one exemplary optical schematic of a dual cavity embodiment the CW mid-IR laser of the present invention.

In at least one embodiment, referring to FIG. 5, separate resonators 50A and 50B are formed about different gain portions of the ring. Each resonator may provide a separate laser output at 51A and 51B. The resonators may be polarized such that outputs from each resonator can be combined with a polarized beam combiner 52 for power scaling in combined output 53. Multiple resonators may have different characteristics including, power, wavelength, and spectral width. Differing resonator characteristics may provide for non-polarized beam combination.

When embodiments of the present invention include a broad spectrum gain medium, wavelength tuning can be accomplished as is known in the field by using a tuning element as the cavity mirror. For example, a Volume Bragg Grating (VBG) may be used as a tuning element in place of an output coupler or a diffraction grating may be used in place of an end mirror. An adjustment mechanism may be used to vary the tuning element and select a resonant wavelength.

Figure 6:
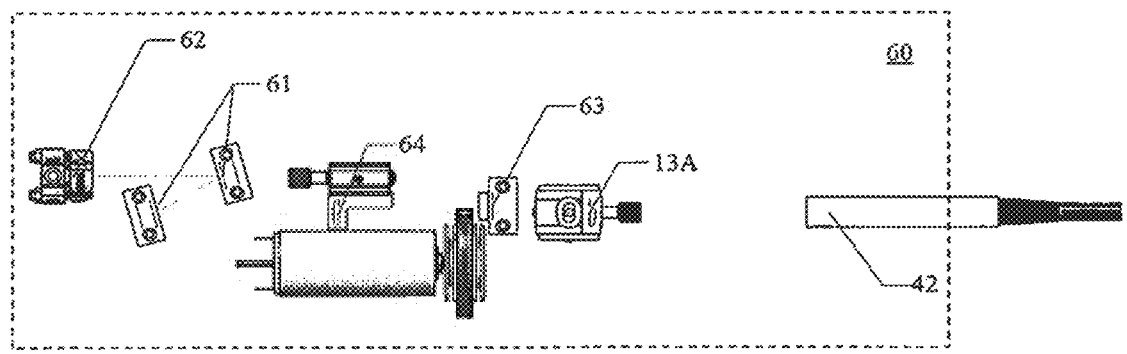
FIG. 6 provides a view of a wavelength selector embodiment of the CW mid-IR laser of the present invention.

In at least one embodiment, referring to FIG. 6 showing a view of a single-lens laser cavity 60 for CL-2940-25 master oscillator with cavity lens 64 and a multi-mirror wavelength selector. Selector mirrors 61 are used in the resonator cavity in addition to a wavelength specific high reflector 63 (HR) and an output coupler 62 (OC). For example, selector mirrors may be coated similar to the HR to provide additional cavity loss to aide in wavelength selection. In cooperation with the HR and selector mirrors, the OC may be transmissive to a different range than the HR and selector mirrors. For example, HR and selectors may have high reflectivity from 2940 nm to 3200 nm and high transmission from 1567 nm to 2700 nm. The OC may have a reflectivity of 80% at 2940 nm and high transmission from 2000 nm to 2800 nm. This combination can be used to shift operation from 2760 nm to 2940 nm with a simple design, high efficiency, and low intracavity losses. Independent beam shaping of a master oscillator laser anode and pump beam allows for further efficiency improvement.

The selector mirror configuration may be used with a dual pump parallel resonator architecture and polarization beam combining for power scaling. This may double the output power, for example, up to 60 W is expected at 200 W total pump power with improved thermal management of the spinning ring gain element.

It is expected that future availability of VBG in this spectral range could be applied to broadening narrow spectral line width and improving wavelength control. In alternative systems, cut-off filters may be used as part of a bandwidth broadening strategy. Application and capability of wavelength selecting and tuning aspects may correspond with different embodiments of a dual pump parallel resonator rotating ring laser.

Figure 7:
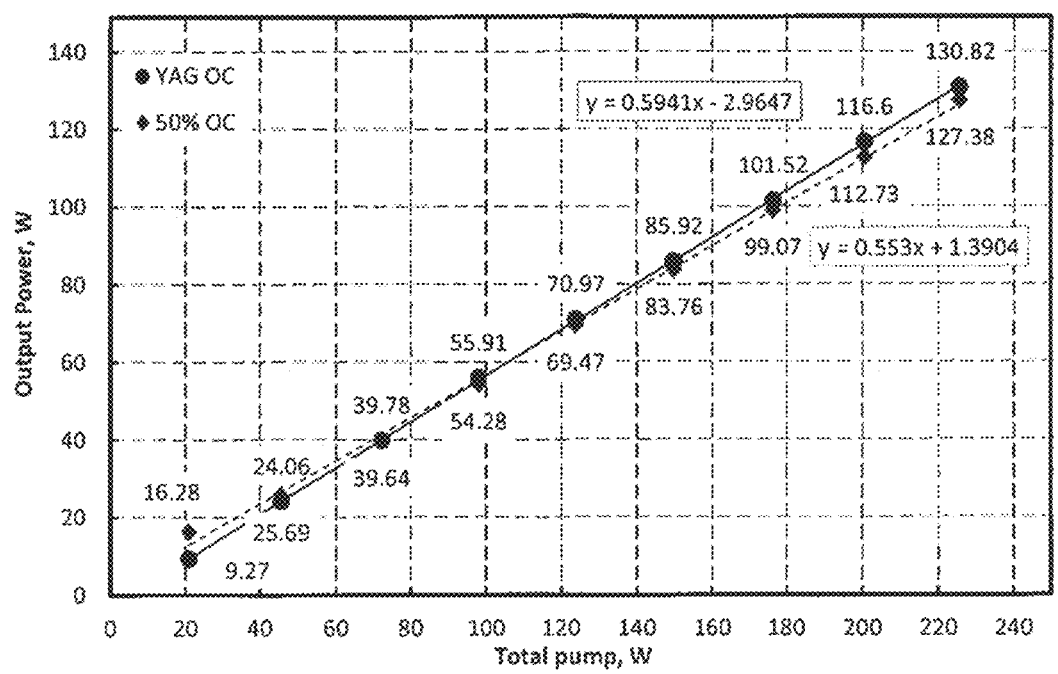
FIG. 7 provides input-output curves generated by the laser of FIG. 2.

FIG. 7 plots Input-Output characteristics of the CL-2500-130-D laser system with 2 versions of output coupler: (1) 50% dielectric broadband OC; and (2) YAG etalon plate. The laser is pumped with 2 TLM-100-1908-WC fiber laser modules. Perfectly linear dependence of the output power on the pump level shows that the gain of the active element is far from saturation and much higher pump power levels are acceptable (with proper thermal management).

Figure 8:
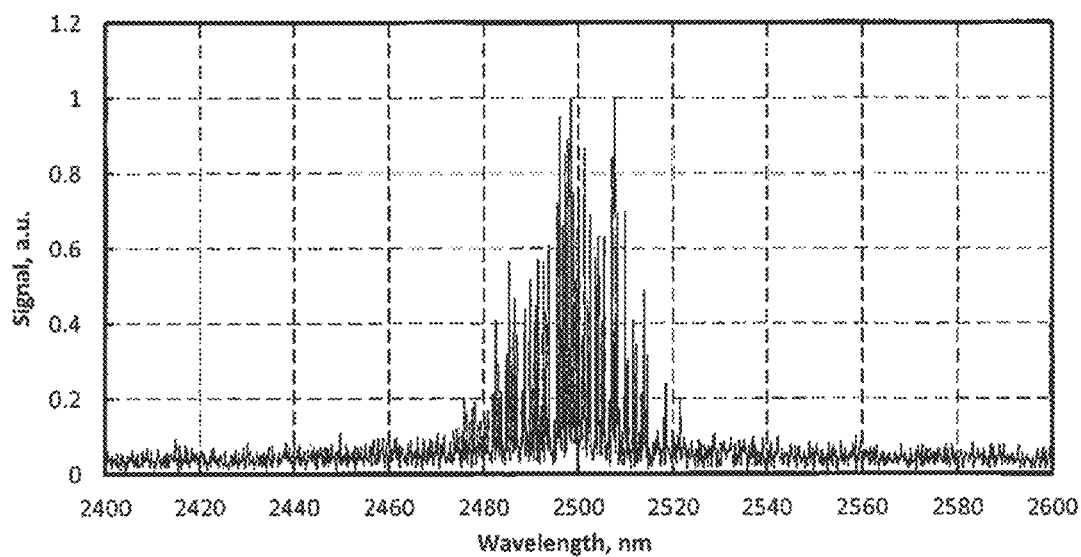
FIG. 8 provides measured output spectrum generated by the laser of FIG. 2.

FIG. 8 shows a measured output spectrum of the CL-2500-130-D laser system at the maximum pump power level. The laser cavity is non-dispersive and does not contain any spectrum control optical elements. This results in broad linewidth of approximately 40 nm.

Figure 9:
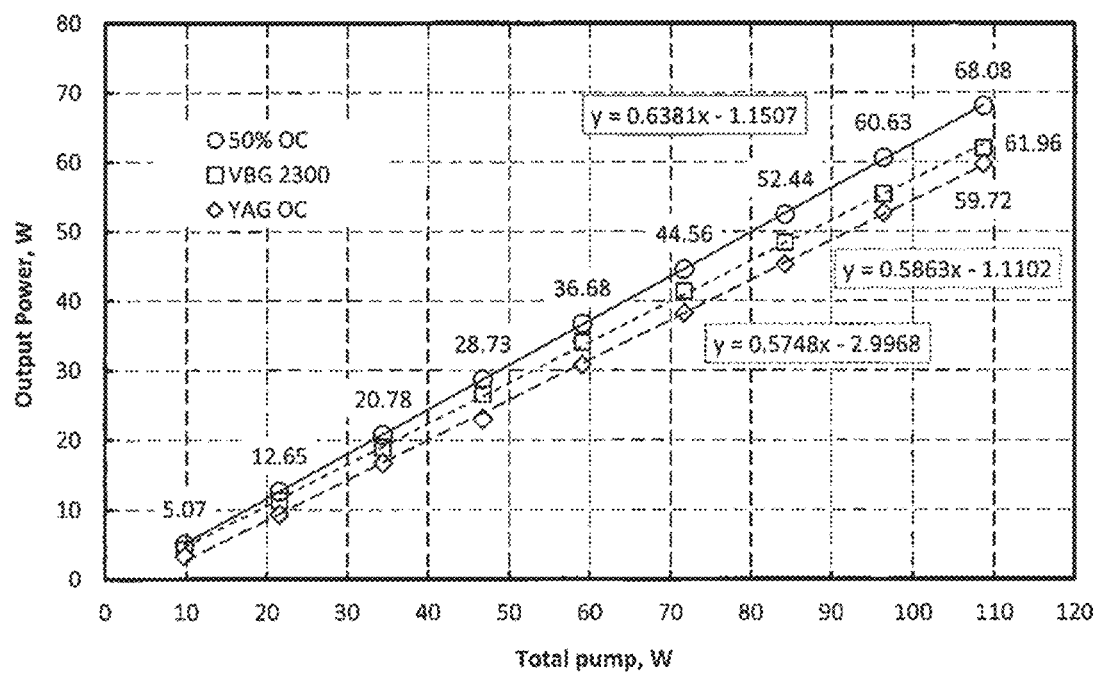
FIG. 9 provides input-output curves generated by the master oscillator of FIG. 4.

FIG. 9 plots Input-Output characteristics of the CL-2500-70-D laser with 2 versions of output coupler and CL-2300-

60-D whose wavelength is set by VBG grating. The laser is pumped with single TLM-100-1908-WC fiber laser module. The laser cavity is the simplest possible single-lens cavity shown in FIG. 4. Perfectly linear dependence of the output power on the pump level shows that the gain of the active element is far from saturation and much higher pump power levels are acceptable (with proper thermal management).

Figure 10:
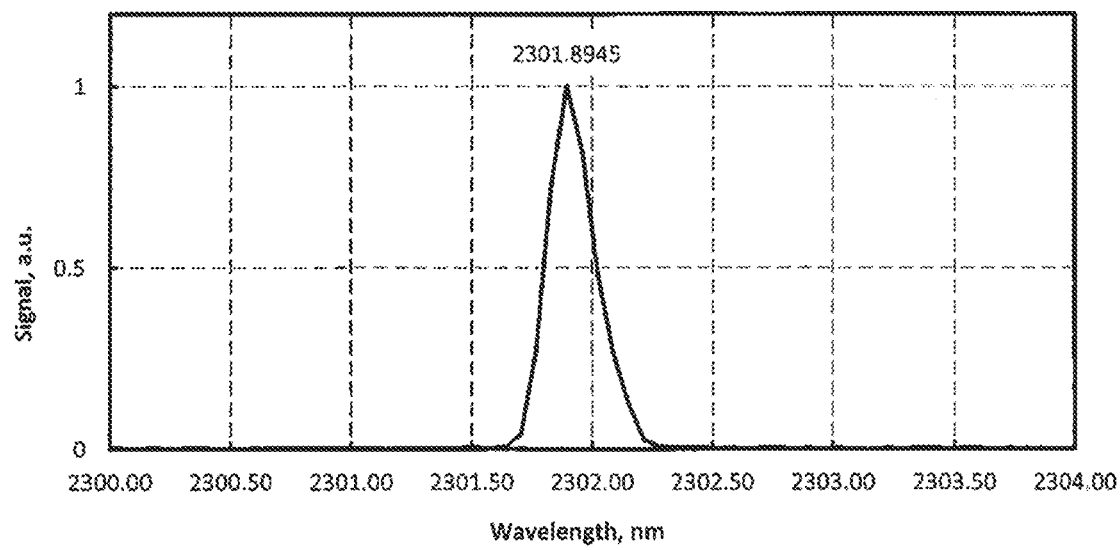
FIG. 10 provides measured output spectrum generated by the master oscillator of FIG. 4.

FIG. 10 shows an Ultra-narrow output spectrum of CL-2300-60-D laser system at maximum output power (~62 W) obtained by using a VBG element as the output coupler (Optigrate, VBG 2300, 50% diffraction efficiency, 1 nm bandwidth). The upper estimate of the laser linewidth at FWHM is <0.25 nm which is in fact the apparatus function of Bristol 721 laser spectrum analyzer.

Figure 11:
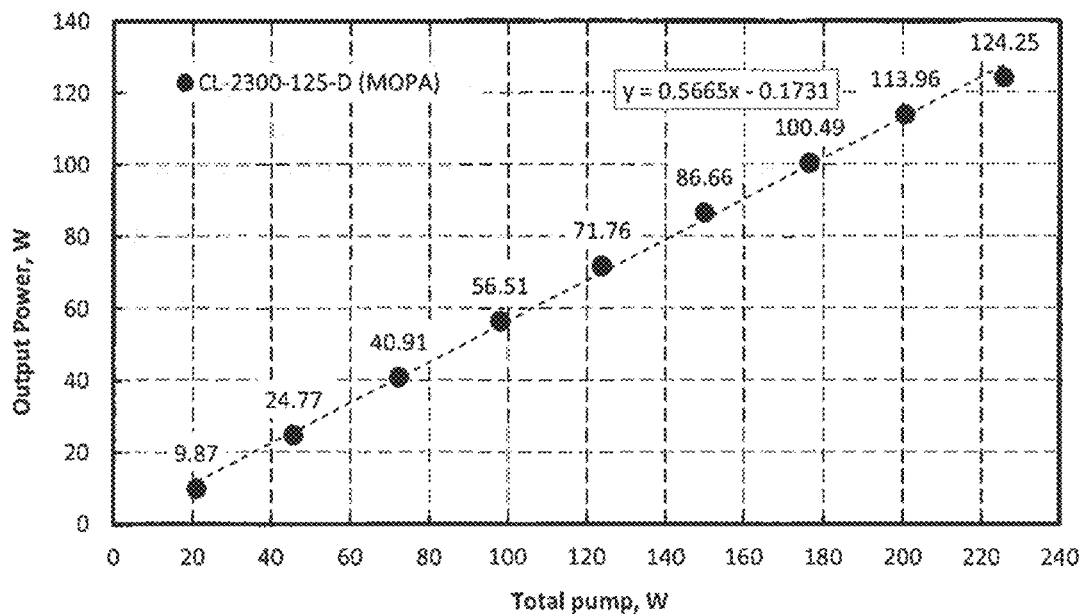
FIG. 11 provides input-output curves generated by the MOPA of FIG. 4.

FIG. 11 plots performance of the MOPA configuration tested with CL-2300-60-D master oscillator. Despite quite high output power and absolute and slope efficiencies, comparable to 4-lens laser cavity, the rollover at the maximum pump indicates that the heat removal is relatively inefficient in the single-pass power amplifier. The excessive heating of the gain channel of the power amplifier also results in distorted Gaussian beam profile (see Table. 1 for details). Therefore, it appears much more feasible to use 4-lens optical cavity in favor of single-pass MOPA systems.

Figure 12:
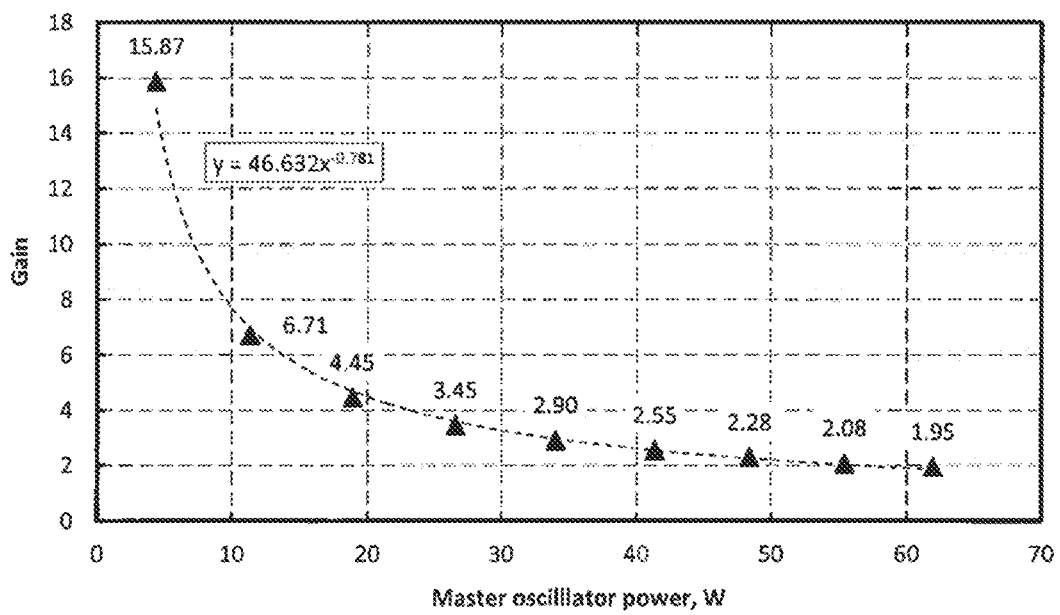
FIG. 12 provides a calculated gain curve of the power amplifier of FIG. 4.

FIG. 12 sets forth calculated gain of the single-pass power amplifier of CL-2300-60-D laser system. The amplifier channel pump is set to its maximum value of 117 W, the master oscillator power is variable. These results show that the spinning ring gain elements can be used very successfully for amplification of low-power CLT laser systems (such as single-frequency tunable laser sources where spinning ring gain element configuration cannot be used directly for frequency stability reasons; yet another example of laser sources that can benefit from the spinning ring amplifier are the mode-locked CLPF systems). This plot also clearly shows that further power amplification with a gain of ~2 might be achieved by using the 4-lens cavity as dual-stage power amplifier.

Figure 13:
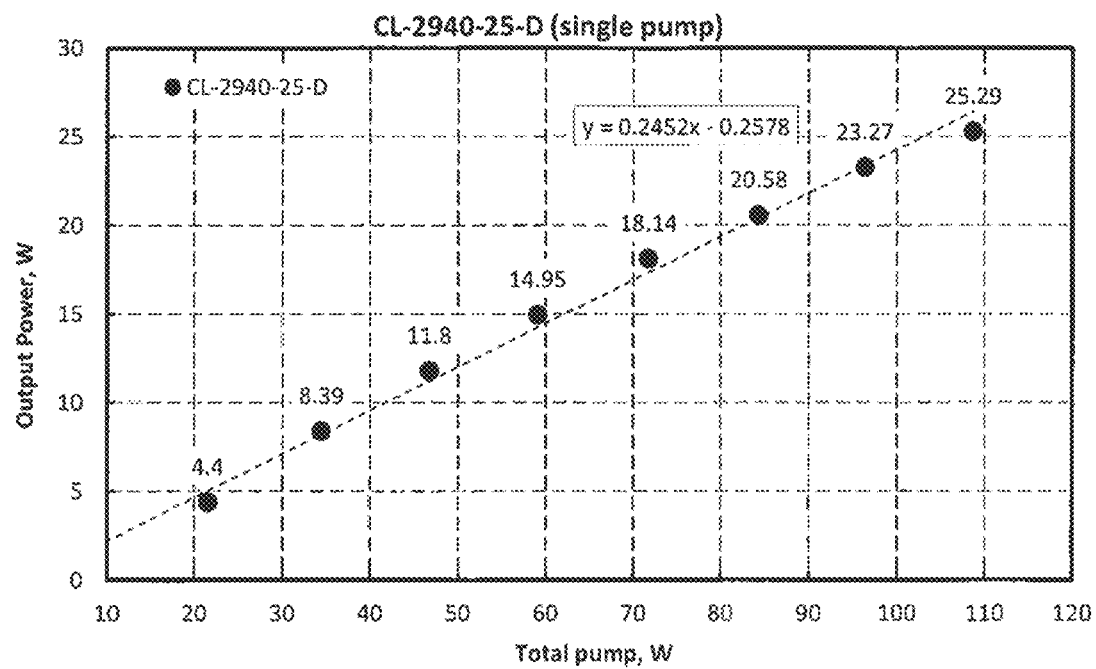
FIG. 13 provides input-output curves generated by the wavelength selector oscillator of FIG. 6, FIG. 14 provides measured output spectrum generated by the wavelength selector oscillator of FIG. 6.

FIG. 13 plots an Input-Output characteristic of CL-2940-25-D master oscillator based on single-lens cavity with multi-mirror wavelength selector. The power rollover is caused by inefficient cooling of the spinning ring gain.

Figure 14:
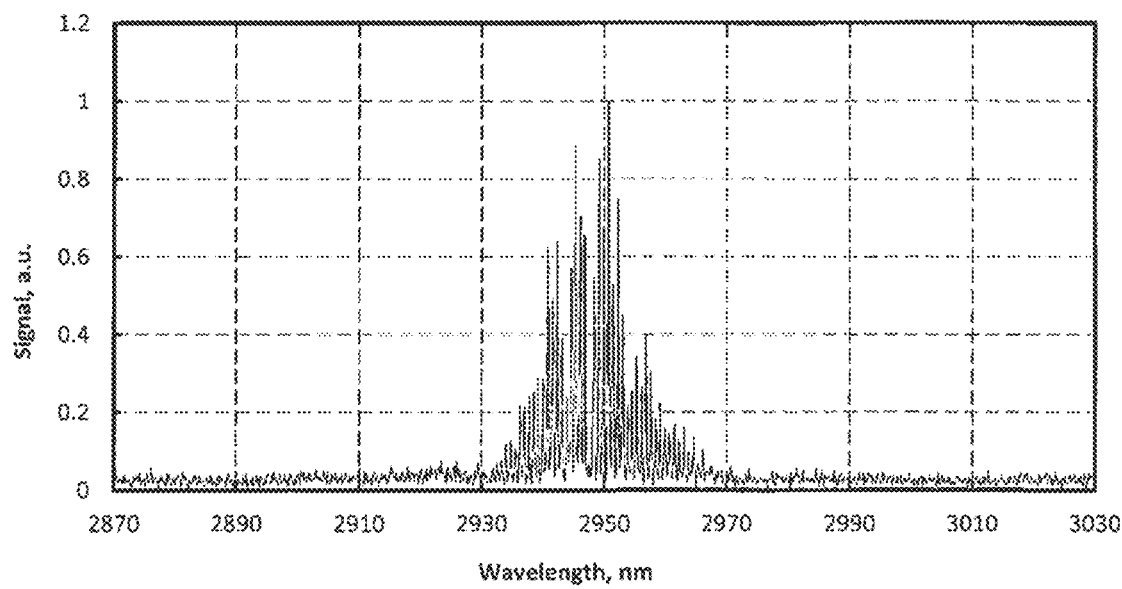

FIG. 14 shows a measured output spectrum of the CL-2940-25-D master oscillator at the maximum pump power level. The laser cavity is generally non-dispersive and does not contain any spectrum narrowing optical elements. This results in broad linewidth of approximately 20 nm (at FWHM).

The observed rollover of the output power at 2940 nm output wavelength (FIG. 13) and in the case of single-pass MOPA (FIG. 11) indicates that the simple approach of spinning ring cooling, used in these prototypes, might be insufficient. In order to investigate thermal performance of the CL-XXXX-XX-D laser systems the following measurement was conducted:

The pump system was instantly switched ON at 100% pump power level (226 W total maximum) and output power of CL-2500-130-D laser system was recorded as a function of time until a maximum drop of 10% was observed. Then the pump was turned OFF for a few minutes. The same measurement was then repeated at smaller levels of pump power with 10% decrement until thermal rollover became negligible.

Figure 15:
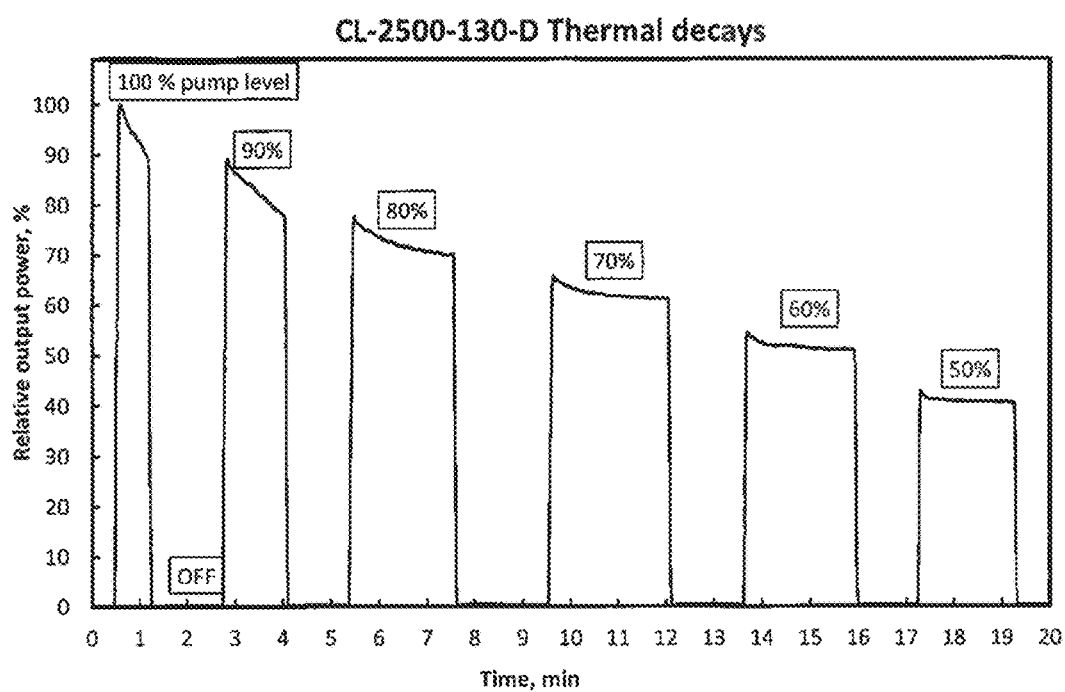
FIG. 15 provides a plot of thermal decay at different levels of total pump.

Referring to FIG. 15, the graph shows thermal decay of the CL-2500-130-D laser output power at different levels of total pump. The percentage labels show pump power levels for each ON/OFF cycle.

One can see from FIG. 15 that as the maximum pump power is reduced thermal decay slows down and becomes smaller until it drops to a negligible value at 50% of total pump (113 W). The thermal decay becomes more pronounced under low lasing efficiency conditions in the cases of 2940 nm output wavelength and single-pass amplifier (more pump power is converted to heat). It was also noticed that the beam quality doesn't degrade despite output power drop. This observation further indicates that the main reason for output power decay is thermal quenching due to relatively inefficient cooling of the spinning ring. Modifications to improve the tested ring cooling arrangement are discussed below.

Figure 16:
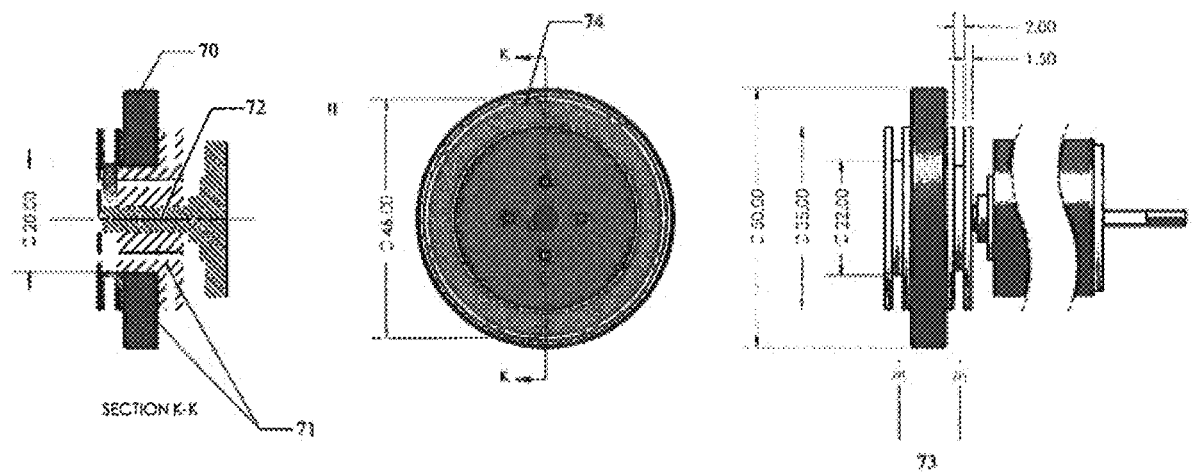
FIG. 16 provides various views of a ring cooling system of an embodiment of the invention.

The tested design of the spinning ring with mounting/cooling flanges shown in FIG. 16 includes crystal to heatsink contact area: 1296 mm2; heatsink to air contact area: 4213 mm2; ZnSe layer thickness between heatsink and laser beam trace: 5.5 mm.

In the tested design the spinning ring 70 is mounted between 2 aluminum flanges 71 coupled to motor shaft 72. The ring external diameter is 50 mm and it has internal mounting hole of 20 mm. The ring rotates at the maximum speed of 5000 rpm. The flanges are cooled with 2 compressed air jets 73 at room temperature at air pressure at the supply nozzle of ~65 psi.

As follows from the laser experiments, this approach of ring cooling is sufficient for total pump power along laser beam trace 74 of up to 100 W at the central wavelengths (2300-2600 nm) and falls to maximum of 50 W at the tails of the Cr:ZnSe emission spectrum.

Disadvantages of the current approach include a relatively small contact area between ring gain element and heat sink (cooling flange). Estimated contact area is ~1296 $mm^2$ and the relatively large distance (5.5 mm) between laser beam trace and heat sink (ZnSe thermal conductivity is much smaller than that of metals thus extra thickness increases thermal resistance). A small number of cooling fins of the mounting/cooling flange results in relatively small contact area between the heat sink and cooling air (~4213 $mm^2$) which may result in insufficient cooling air flow.

Figure 17:
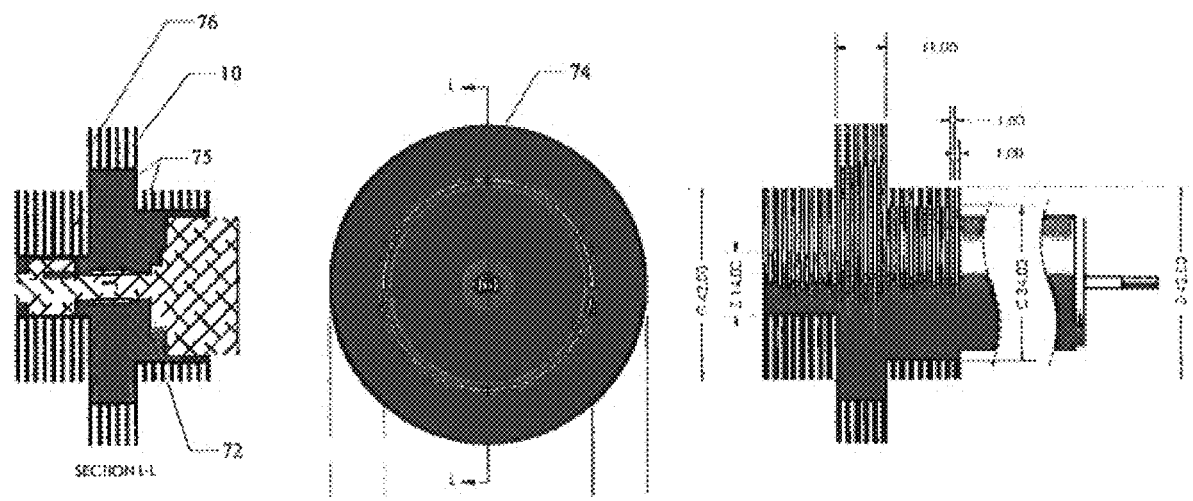
FIG. 17 provides various views of an improved ring cooling system of an embodiment of the invention.

To mitigate the thermal issues and increase the maximum acceptable pump power a set of simple modifications to the cooling system is illustrated an improved ring cooling system in FIG. 17. These modifications include a crystal to heatsink contact area of 2693 $mm^2$; a heatsink to air contact area of 29053 $mm^2$; and a ZnSe layer thickness between heatsink and laser beam trace of 2.0 mm. In addition to improved internal flanges 75, an additional external heatsink 76 on the outer rim of the ring further improves the heat removal. The cooling air flow jets contemplated will distribute the flow among all fins of the spinning flanges.

Figure 18:
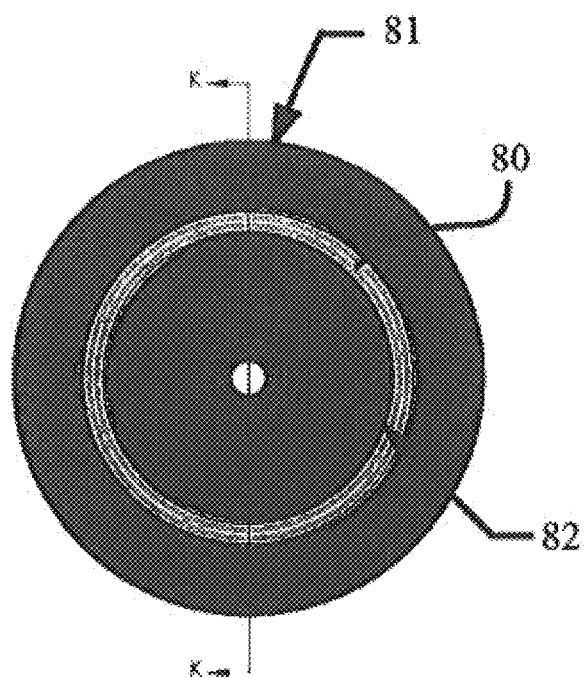
FIG. 18 provides one view of a composite stacked ring gain element of an embodiment of the invention.

To further improve heat removal from the gain element and reach kW levels of output power, more advanced heat management is required. One of the most promising approaches is to use a Cr:ZnSe ring 80 stacked between external flange 81 and internal flange 82 made of highly conductive material (e.g. copper or carbon fiber or composites thereof). FIG. 18 illustrates a concept design of a stacked ring gain element.

FIG. 19 illustrate the results obtained with some of the above-disclosed schematics. For example, in the schematic of FIG. 1C operating at 2500 nm and configured with two channels, two pumps at 226W each and a four-lens cavity, the output characteristics were as follows: maximum power—131W, absolute efficiency—58%, slope efficiency—59%. The output beam has a well-defined Gaussian shape. In the schematic of FIG. 6 including a single channel, single pump at 109W, simplest single-lens laser cavity and wavelength-selecting element which allows the schematic to operate at 2500 nm and 2300 nm, maximum power of 68W is achieved at 2500 nm vs. 62W at a 2300 nm wavelength. Similarly, the schematic at 2500 nm operates at the absolute efficiency of 58%, whereas the schematic at 2300 nm is characterized by only 57%. The slope efficiency at 2500 nm wavelength is 64%. In contrast, this schematic at 2300 nm wavelength has only 59% slope efficiency. The output beam preserves a distinctive Gaussian shape. Another schematic, outputting Gaussian bema at a 2940 nm wavelength and including a single channel, single pump (109W), single-lens cavity and multi-mirror wavelength selector, is characterized by 25W maximum power, 23% absolute efficiency and 25% slope efficiency. Still another modification of the schematic of FIG. 6 operates at 2300 nm and its characteristics include 124 W maximum power, 55% absolute efficiency and 57% efficiency slope. However, the output beam has a distorted Gaussian shape.

Additional aspects of laser system elements, gain materials, ring features, pumps, cooling, and ring rotation are found in the incorporated '309 reference. In particular the '309 description at paragraphs [029] through [038] the accompanying '309 drawings.

A variety of changes of the disclosed structure may be made without departing from the spirit and essential characteristics thereof. Thus, it is intended that all matter contained in the above description should be interpreted as illustrative only and in a limiting sense, the scope of the disclosure being defined by the appended claims.

The invention claimed is:

1. A continuous wave ("CW") laser with a mid-IR output comprising:
   a resonant cavity;
   a gain medium being formed into a ring rotatable about an axis defined by an inner circumferential surface, an outer circumferential surface, a first face and a second face, the gain medium with a first non-stationary gain portion between the first and second faces within the resonant cavity to provide first mid-IR gain, and a second non-stationary gain portion spaced radially from the first non-stationary portion and located between the first and second faces within the resonant cavity to provide supplementary mid-IR gain;
   a first pump source outputting a first pump beam propagating through the first non-stationary gain portion parallel to the axis and sufficient to emit the first CW laser beam so as to provide the first mid-IR gain;
   a second pump source outputting a second beam propagating through the second non-stationary gain portion parallel to the axis and sufficient to emit a CW laser second laser beam so as to provide the second mid-IR gain;
   a rotatable mounting structure in thermal contact with the ring, and
   a motor coupled to the rotatable mounting structure to rotate the ring about the axis; and
   wherein the first and second non-stationary gain portions of the ring in transit through the resonant cavity receive respective second and first laser beams so as to increase a power of the mid-IR output.

2. The CW laser of claim 1, wherein the gain medium is selected from polycrystalline transition metal doped II-VI materials (TM:II-VI).

3. The CW laser of claim 1, wherein the gain medium is characterized as of Cr:ZnSe.

4. The CW laser of claim 1, wherein the gain medium is characterized as of Cr:ZnS.

5. The CW laser of claim 1, further comprising at least one optical cavity element for mid-IR output wavelength selection.

6. The CW laser of claim 1, further comprising at least one optical cavity element for narrowing the spectral line width of the mid-IR output.

7. The CW laser of claim 1, wherein the gain medium is a composite stacked ring gain element.

8. The CW laser of claim 1, wherein the first non stationary gain portion and the second non-stationary gain portion each provide gain in the resonant cavity.

9. The CW laser of claim 1, wherein the first non-stationary gain portion provides gain as a master oscillator and the second non-stationary gain portion provides single pass amplification to output from the master oscillator.

10. The CW laser of claim 1, wherein the resonant cavity comprises a cavity mirror proximate to the first face of the ring and an output coupler proximate to the first face of the ring.

11. The CW laser of claim 1, further comprising optical elements for redirecting the optical path from the first gain portion to the second gain portion, the optical elements disposed proximate to the second face of the ring.

12. The CW laser of claim 1, further comprising optical elements for focusing the first and second pump sources to respective first and second gain portions of the ring.

13. The CW laser of claim 1, further comprising one or more lens elements for focusing mid-IR light.

14. The CW laser of claim 1, wherein the first non-stationary gain portion provides gain in a first resonant cavity and the second non-stationary gain portion provides gain in a second resonant cavity.

15. The CW laser of claim 14, further comprising at least one beam combiner optical element, wherein the first non-stationary gain portion provides a first output, the second non-stationary gain portion provides a second output, and the beam combiner combines the first and second outputs into the mid-IR output.

* * * * *